United States Patent
Looney et al.

(10) Patent No.: US 10,645,095 B2
(45) Date of Patent: *May 5, 2020

(54) SELECTIVE VERIFICATION OF SIGNATURES BY NETWORK NODES

(71) Applicant: Juniper Networks, Inc., Sunnyvale, CA (US)

(72) Inventors: Jonathan T. Looney, Syracuse, NY (US); John G. Scudder, Ann Arbor, MI (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,801

(22) Filed: Sep. 24, 2018

(65) Prior Publication Data

US 2019/0036943 A1    Jan. 31, 2019

Related U.S. Application Data

(63) Continuation of application No. 15/198,468, filed on Jun. 30, 2016, now Pat. No. 10,084,798.

(51) Int. Cl.
*H04L 29/00* (2006.01)
*H04L 29/06* (2006.01)
(Continued)

(52) U.S. Cl.
CPC .......... *H04L 63/126* (2013.01); *H04L 9/3247* (2013.01); *H04L 9/3265* (2013.01); *H04L 63/10* (2013.01); *H04L 45/02* (2013.01)

(58) Field of Classification Search
CPC ... H04L 9/3247; H04L 63/0823; H04L 63/08; G06F 21/31; G06F 21/83
See application file for complete search history.

(56) References Cited

U.S. PATENT DOCUMENTS 6,625,734 B1    9/2003   Marvit
9,306,932 B2    4/2016   Himawan et al.
(Continued)

FOREIGN PATENT DOCUMENTS

CN    1677978 A    10/2005
CN    1829950 A    9/2006
(Continued)

OTHER PUBLICATIONS

Wikipedia, "Border Gateway Protocol," https://en.wikipedia.org/wiki/Border_Gateway_Protocol, Jun. 19, 2016, 15 pages.
(Continued)

*Primary Examiner* — Ghazal B Shehni
(74) *Attorney, Agent, or Firm* — Harrity & Harrity, LLP

(57) ABSTRACT

A network node may include one or more processors. The one or more processors may receive a message that is associated with one or more signatures and one or more second signatures. The one or more signatures may have been validated by a particular node. The one or more processors may determine that the particular node is a trusted node. The network node may be configured not to validate signatures that have been validated by a trusted node. The one or more processors may determine that the one or more signatures have been validated by the particular node. The one or more processors may sign or provide the message, without validating the one or more signatures, based on determining that the one or more signatures have been validated by the particular node.

20 Claims, 9 Drawing Sheets

(51) Int. Cl.
*H04L 9/32* (2006.01)
*H04L 12/751* (2013.01)

(56) References Cited

U.S. PATENT DOCUMENTS

| | | | |
|---|---|---|---|
| 10,084,798 B2 | 9/2018 | Looney et al. | |
| 2006/0268838 A1 | 11/2006 | Larsson | |
| 2007/0277225 A1* | 11/2007 | Rits | G06F 21/606 726/2 |
| 2013/0159703 A1 | 6/2013 | Himawan et al. | |

FOREIGN PATENT DOCUMENTS

| | | |
|---|---|---|
| CN | 101923875 A | 12/2010 |
| CN | 103270718 A | 8/2013 |
| CN | 103731469 A | 4/2014 |
| CN | 104184584 A | 12/2014 |
| WO | WO 2016/096005 | 6/2016 |

OTHER PUBLICATIONS

Rekhter et al., "A Border Gateway Protocol 4 (BGP-4)," http://www.rfc-base.org/bct/rfc-4271.txt, Jan. 2006, 104 pages.

Lepinski et al., "BGPsec Protocol Specification," https://tools.ietf.org/pdf/draft-ietf-sidr-bgpsec-protocol-17.pdf, Jun. 23, 2016, 34 pages.

Kent et al., "Secure Border Gateway Protocol (S-BGP)", IEEE Journal on Selected Areas in Communications, vol. 18, No. 4, Apr. 2000, 11 pages, XP011449965.

T. Freeman et al., "Server-Based Certificate Validation Protocol (SCVP)", Network Working Group RFC 5055, Dec. 2007, 88 pages, XP015055127.

Extended European Search Report corresponding to EP 16 19 3854, dated May 16, 2017, 10 pages.

* cited by examiner

US 10,645,095 B2

SELECTIVE VERIFICATION OF SIGNATURES BY NETWORK NODES

RELATED APPLICATION

This application is a continuation of U.S. patent application Ser. No. 15/198,468, filed Jun. 30, 2016 (now U.S. Pat. No. 10,084,798), the disclosure of which is incorporated herein by reference.

BACKGROUND

Endpoint devices of a network may communicate via nodes (e.g., network devices, such as routers, gateways, switches, hubs, etc.) included in the network. For example, a first endpoint device may transmit data to a node, and the node may use routing information to identify one or more other nodes to carry the data to a second endpoint device. In some cases, endpoint devices may be associated with different networks and/or different node groups. In such cases, the routing information corresponding to two endpoint devices may identify a path, along nodes of two or more different node groups, on which the data is to be carried.

SUMMARY

According to some possible implementations, a network node may include one or more processors. The one or more processors may receive a message that is associated with one or more signatures. The one or more signatures may have been validated by a particular node. The one or more processors may determine that the particular node is a trusted node. The network node may be configured not to validate signatures that have been validated by a trusted node. The one or more processors may determine that the one or more signatures have been validated by the particular node. The one or more processors may sign or provide the message, without validating the one or more signatures, based on determining that the one or more signatures have been validated by the particular node.

According to some possible implementations, a non-transitory computer-readable medium may store one or more instructions that, when executed by one or more processors of a network node, may cause the one or more processors to receive a message that is associated with one or more first signatures and one or more second signatures. The one or more first signatures may be validated by a particular node. The one or more instructions, when executed by one or more processors of the network node, may cause the one or more processors to determine that the particular node is a trusted node. The network node may be configured not to validate signatures that are validated by a trusted node. The one or more instructions, when executed by one or more processors of a network node, may cause the one or more processors to determine that the one or more first signatures have been validated by the particular node and that the one or more second signatures have not been validated by the particular node. The one or more instructions, when executed by one or more processors of the network node, may cause the one or more processors to validate the one or more second signatures and not the one or more first signatures based on determining that the one or more first signatures have been validated by the particular node and that the one or more second signatures have not been validated by the particular node. The one or more instructions, when executed by one or more processors of a network node, may cause the one or more processors to sign or provide the message based on validating the one or more second signatures.

According to some possible implementations, a method may include receiving, by a network node, a route update message that is associated with one or more signatures corresponding to routing information. The one or more signatures may be validated by a particular node to validate the routing information. The method may include determining, by the network node, that the particular node is a trusted node. The network node may be configured not to validate signatures that have been validated by a trusted node. The method may include determining, by the network node, that the one or more signatures correspond to the routing information that the particular node has validated based on validating the one or more signatures. The method may include signing or providing, by the network node, the route update message without validating the one or more signatures.

DETAILED DESCRIPTION

Figure 1A:
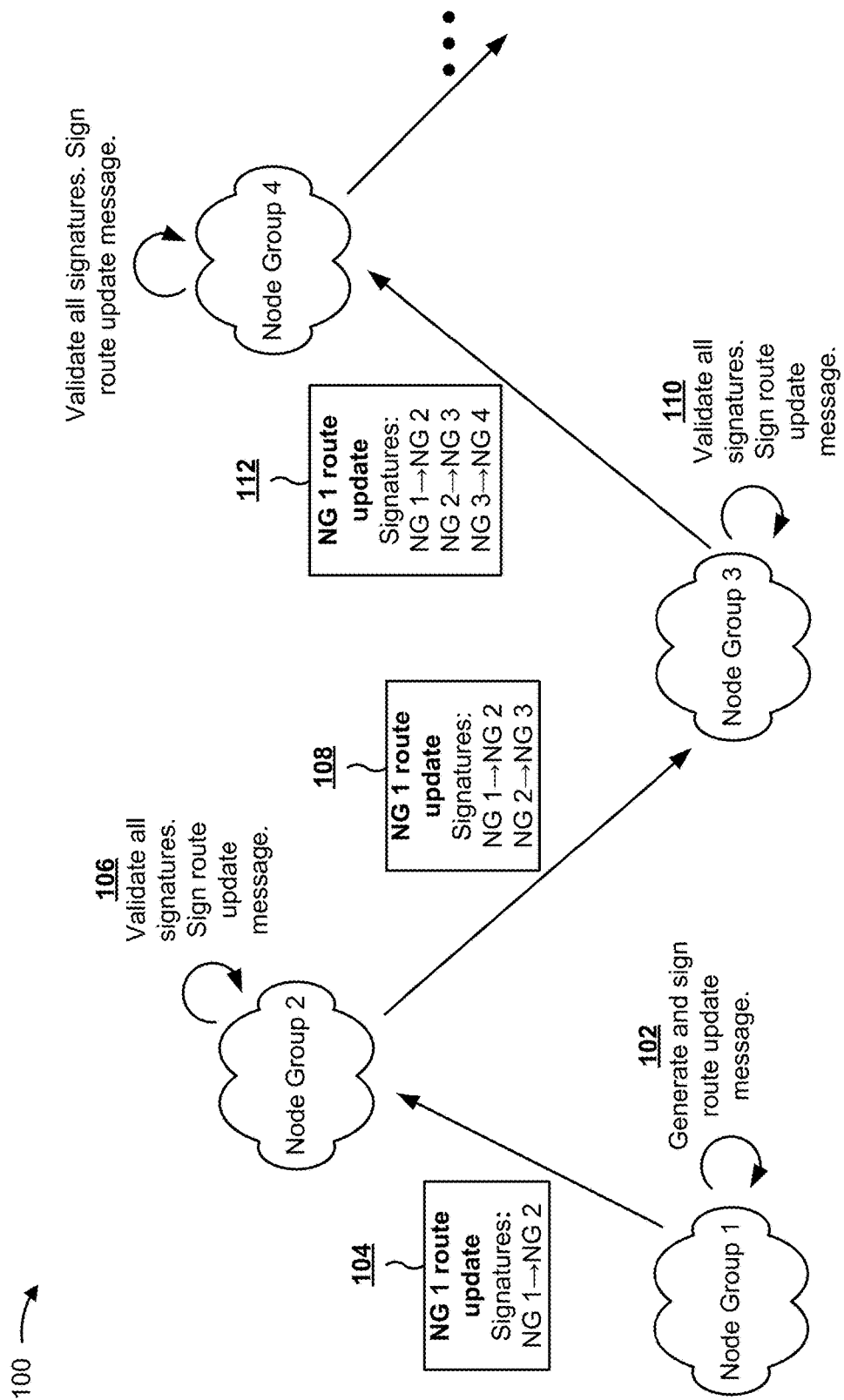
FIGS. 1A-1E are diagrams of an overview of an example implementation described herein.

The following detailed description of example implementations refers to the accompanying drawings. The same reference numbers in different drawings may identify the same or similar elements.

Groups of network nodes (hereinafter referred to as node groups) may carry network traffic between endpoint devices of a network. As described herein, a node group is a collection of network nodes that may be administrated by a single network provider based on a particular protocol (e.g., an interior or exterior gateway protocol) and that may be associated with internal routing or switching rules. A node of a first node group may receive network traffic en route to a node of a second node group, and may identify a route of nodes to carry the network traffic to the second node group based on a routing table and/or a forwarding table. The nodes on the route may be part of the first node group, the second node group, or one or more intermediate node groups.

To advertise or update a route between node groups, a node may transmit a route update message. The route update message may include a network address identifying one or more nodes, such as a prefix, or the like. A prefix is a network address (e.g., an IPv4 network address, an IPv6 network address, etc.) and a bit mask, a mask length, or the like, that identifies one or more nodes, node groups, or devices. A prefix is sometimes used to route or forward network traffic to a set of devices associated with the prefix.

When a node group receives the route update message, the node group may add, to the route update message, information identifying the node group. In some cases, the node group may update a routing table based on the route update message. The node group may transmit the route update message to other downstream node groups, which may perform similar operations. In this way, routing tables of the node groups may be updated based on connections between node groups. One example of a protocol to perform this routing table update process is the border gateway protocol (BGP).

However, when security processes are not implemented, route update messages may be easy to modify or forge. For example, based on a man-in-the-middle attack, or the like, an entity may generate or modify a route update message to cause network traffic to be routed to a malicious device, to be blocked, or the like.

To improve security of the routing table update process, the node groups may implement a security process that permits the node groups to validate or authenticate a route update message based on a source of the route update message. One such security process may include BGP Security (BGPsec). When using BGPsec, each node group that receives and forwards a route update message may digitally sign the route update message using a corresponding private key. The set of signatures attached to a route update message may be referred to herein as a "signature chain." When a downstream node group receives the message, the recipient node group may validate each signature of the signature chain using a public key associated with the corresponding private key to determine whether the path of the route update message is authentic. The downstream node group may add a signature to the signature chain, and may transmit the route update message, as an upstream node group, to one or more other downstream node groups. Thus, security of the routing table update process is improved.

However, validation of every link of the signature chain by every node group may be processor-intensive. This may reduce or eliminate adoption of such a security process, thus reducing network security. Further, the processing load associated with such a process may be significant for nodes and node groups at the edge of a network, such as the Internet, based on the nodes and node groups at the edge of the network receiving route update messages that identify routes with longer paths and, therefore, more signatures than other nodes and node groups at the core of the network.

Implementations described herein permit selective validation of signatures of a signature chain based on whether a trusted device (e.g., a trusted node or a trusted node group) has previously validated part of, or all of, the signature chain. Thus, processor resources are conserved that would otherwise be used to validate every signature of the signature chain in every case.

Furthermore, implementations described herein may permit selective signing of a route update message based on whether a downstream recipient of the route update message is permitted to receive a route update message with a valid signature chain. Thus, a provider of the route update message may provide a route update message that the downstream recipient is capable of successfully validating (e.g., based on one or more security processes between the provider and the downstream recipient), and that the downstream recipient is not capable of providing to a further downstream node group with a verifiable signature chain. For example, the provider may want to provide the ability to transmit a valid signature chain as a service, thereby preventing the downstream recipient from providing secured routing information without authorization or subscription to the service. Thus, network congestion may be reduced by preventing unauthorized node groups from advertising verifiable routing information. Further, network security may be improved by exerting control over which node groups are permitted to access the signature chain service (e.g., by preventing suspected malicious parties from receiving a valid signature chain, etc.). Still further, processor resources are conserved that would otherwise be used to sign the route update message.

Figure 1B:
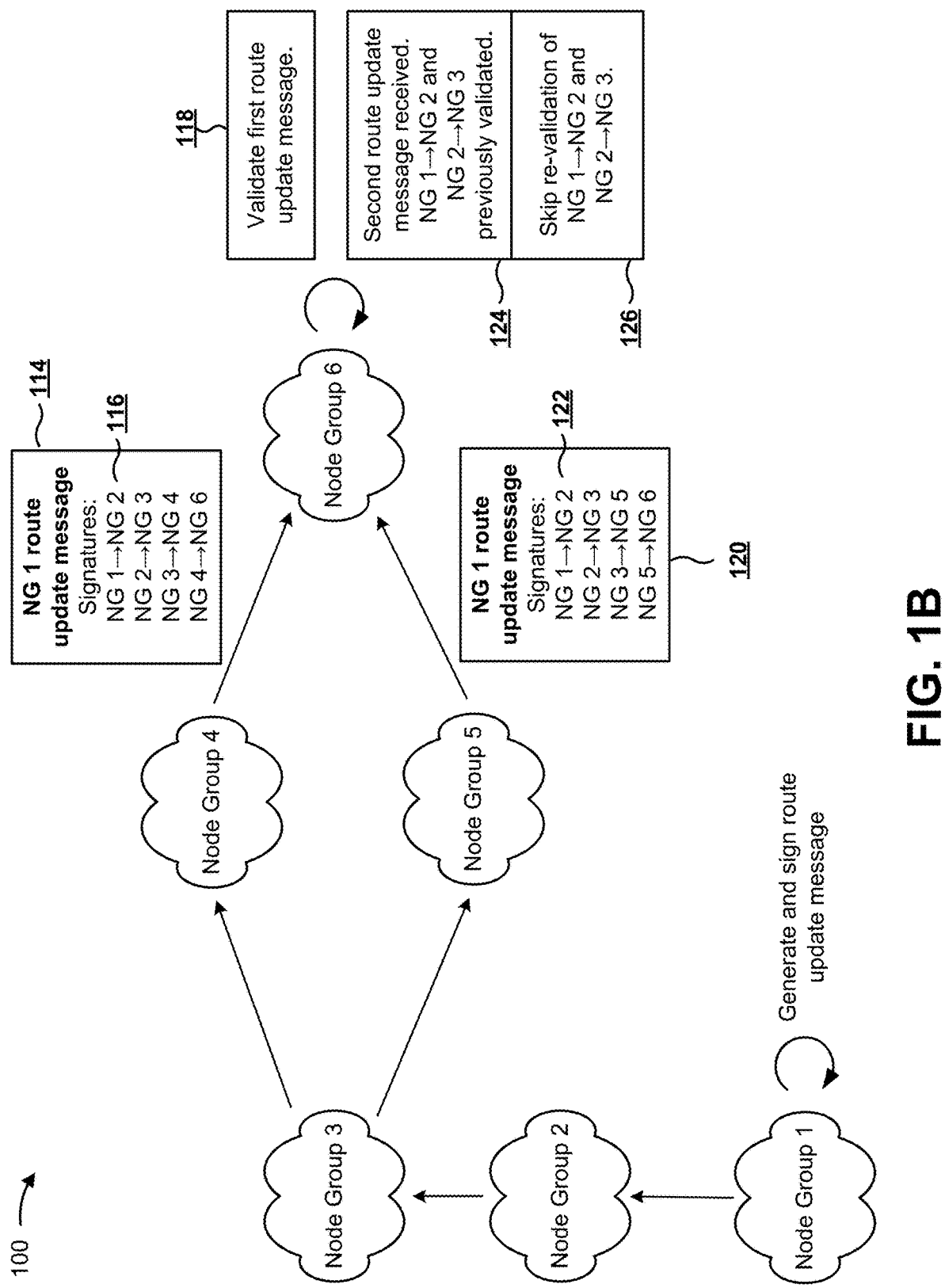
Figure 1C:
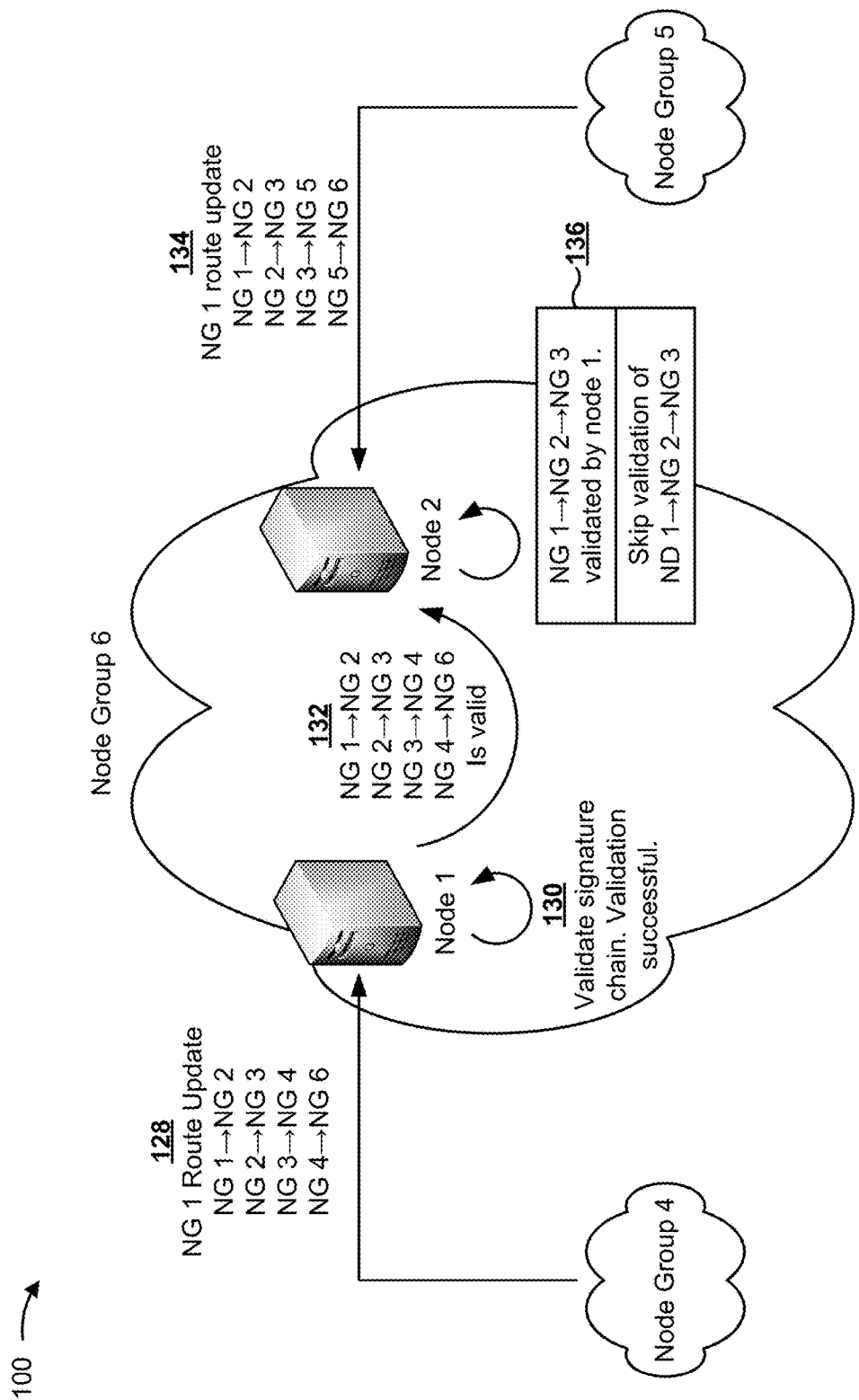
Figure 1D:
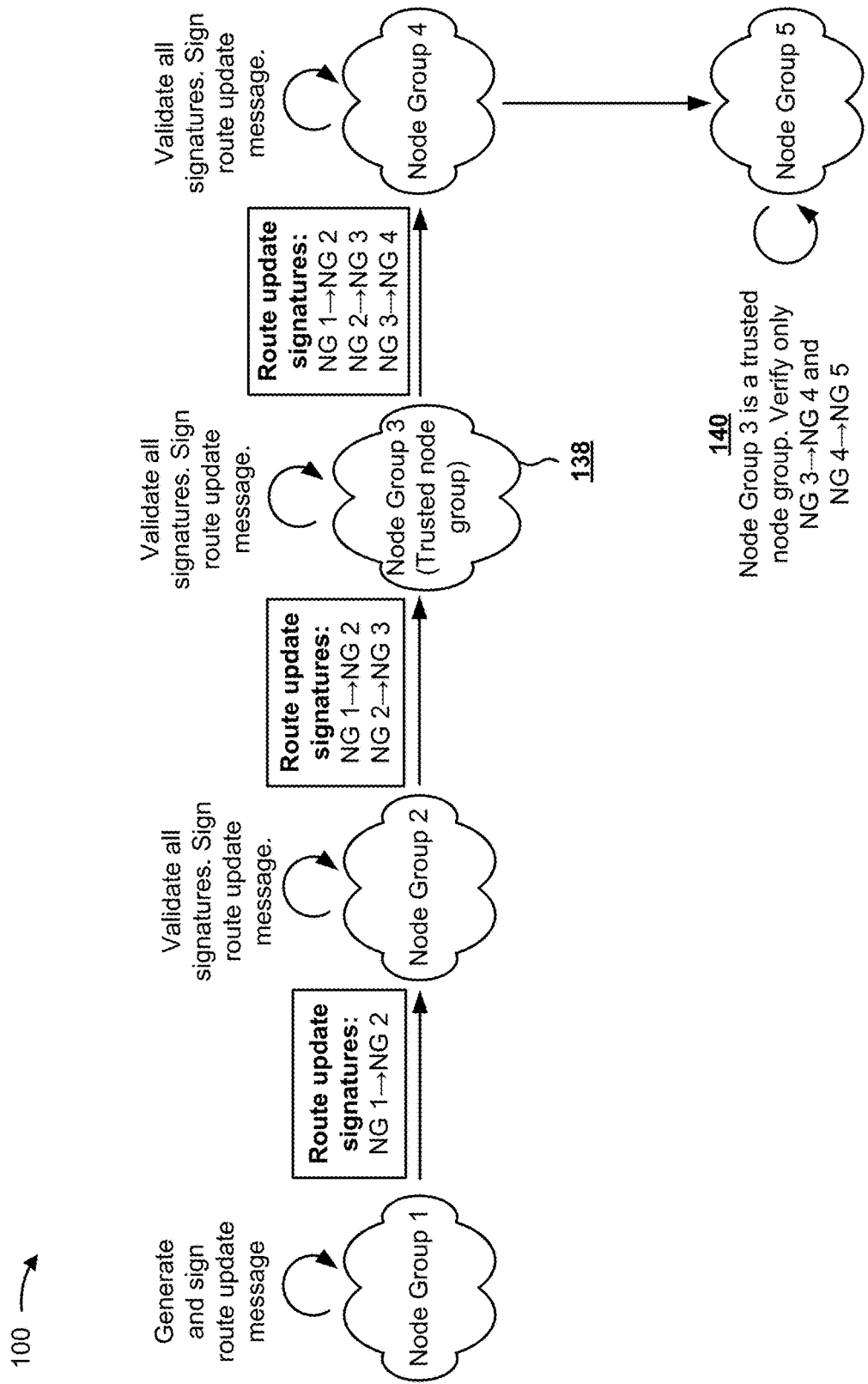
Figure 1E:
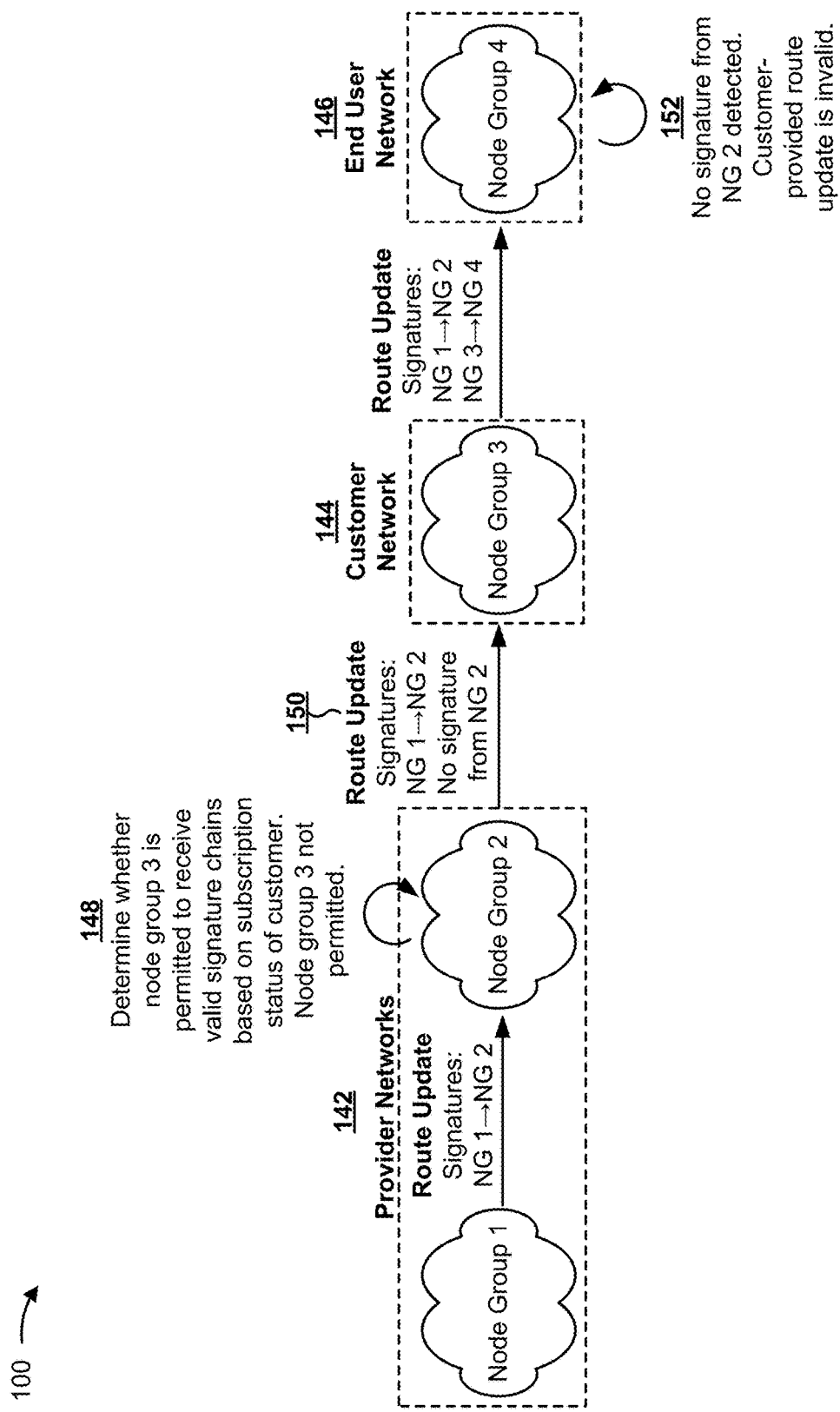

FIGS. 1A-1E are diagrams of an overview of an example implementation 100 described herein. FIGS. 1A-1D show examples of selectively validating signatures based on whether a trusted node or node group has previously validated the signatures, and FIG. 1E shows an example of selectively signing a route update message based on whether a future recipient of the route update message is permitted to receive a valid signature chain.

As shown in FIG. 1A and by reference number 102, a first node group (e.g., node group 1, or an origin node group) may generate and/or transmit a route update message to a second node group (e.g., node group 2, or a downstream node group). For example, a node of node group 1 (e.g., an edge node of node group 1) may transmit the route update message to a node of node group 2 (e.g., an edge node of node group 2). Assume that the route update message includes a particular network prefix that identifies the first node group.

As shown by reference number 104, the route update message may include a first signature that is generated by node group 1. The first signature may correspond to a first "hop" of a route corresponding to the route update message, and may be generated by an edge node of node group 1 that transmitted the message, across a node group boundary of node group 1, to node group 2. For example, node group 1 may generate the route update message, and may sign the route update message or attach the first signature to the route update message. As further shown, the route update message may include a network address or prefix identifying node group 1 (e.g., NG 1 route update).

As shown by reference number 106, node group 2 may validate each signature associated with the route update message (e.g., the first signature). Assume that node group 2 determines that the first signature is valid. As further shown, based on determining that the first signature is valid, node group 2 may sign the route update message. In some implementations, node group 2 may add, to a routing table, information that identifies the route from node group 2 to node group 1 (e.g., based on the network address or prefix of node group 1).

As shown by reference number 108, node group 2, as an upstream node group, may provide the route update message to node group 3 as a downstream node group. As further shown, the route update message may include the first signature corresponding to the route between node group 1 and node group 2, and a second signature corresponding to the route between node group 2 and node group 3. As shown by reference number 110, node group 3 may validate the first signature and the second signature, and may add a third signature to the route update message when validation of the first signature and the second signature is successful. In some implementations, node group 3 may add information to a routing table of node group 3 identifying the route to node group 1.

As shown by reference number 112, node group 3, as an upstream node group, may provide the route update message to node group 4 as a downstream node group, and node group 4 may perform operations similar to those performed by node groups 2 and 3. In this way, node groups 1 through 4 perform a security process (e.g., BGPsec, etc.) to improve security of the route update message. However, as the quantity of node groups in the path of a route update message increases, processor usage when validating signatures of the node groups may increase.

FIG. 1B shows an example of a node group (e.g., node group 6) receiving route update messages on two different routes. As shown, node group 1 (e.g., an origin node group) may generate a route update message. The route update message may identify node group 1 (e.g., based on a network address or prefix corresponding to node group 1). As further shown, node group 1 may provide the route update message to node group 2, which may sign and provide the route update message to node group 3, and so on. As shown by reference number 114, node group 6 may receive a first route update message on a first route. As shown by reference number 116, the first route update message may include a signature chain of signatures generated by node groups 1, 2, 3, and 4, based on the first route update message being validated and/or transmitted by node groups 1, 2, 3, and 4. In some implementations, the first route update message may identify node group 1 (e.g., based on the network address or prefix, and based on the first route update message originating from node group 1). As shown by reference number 118, node group 6 may validate the signatures associated with the first route update message (e.g., NG 1-NG 2, NG 2-NG 3, NG 3-NG 4, and NG 4-NG 6). Assume that node group 6 successfully validates the signatures.

As shown by reference number 120, node group 6 may receive a second route update message. Assume that node group 6 receives the second route update message after the first route update message. As shown by reference number 122, the second route update message may include a signature chain of signatures generated by node groups 1, 2, 3, and 5, based on the second route update message being validated and/or transmitted by node groups 1, 2, 3, and 5. As further shown, the second route update message may identify node group 1 (e.g., based on the network address or prefix, and based on the second route update message originating from node group 1).

As shown by reference number 124, node group 6 may determine that a portion of the signature chain has previously been validated (e.g., NG 1-NG 2 and NG 2-NG 3). For example, based on the first route update message and the second route update message being associated with the network address or prefix that identifies node group 1, and based on the signatures of NG 1-NG 2 (e.g., the origin node group) and NG 2-NG 3 being included in the first route update message and the second route update message, node group 6 may determine that node group 6 has previously validated the signatures of NG 1-NG 2 and NG 2-NG 3.

As shown by reference number 126, based on the signatures of NG 1-NG 2 and NG 2-NG 3 having previously been validated and based on the first route update message and the second route update message originating from node group 1, node group 6 may not re-validate the signatures of NG 1-NG 2 and NG 2-NG 3. Thus, node group 6 conserves processor resources that otherwise would have been used to re-validate the signatures of NG 1-NG 2 and NG 2-NG 3.

FIG. 1C is an example of determining whether a trusted node has validated one or more signatures. As shown in FIG. 1C, and by reference number 128, node 1 of node group 6 may receive a first route update message from node group 4. As further shown, the first route update message may include a signature chain with signatures of NG 1-NG 2, NG 2-NG 3, NG 3-NG 4, and NG 4-NG 6.

As shown by reference number 130, node 1 may successfully validate the signature chain. As shown by reference number 132, based on successfully validating the signature chain, node 1 may provide, to node 2 of node group 6, information indicating that the signature chain of the first route update message is valid. Here, node 1 is a trusted node of node 2 based on node 1 and node 2 being associated with the same node group. For example, an administrator of node group 6 may be capable of ensuring the security of internal communication such that nodes, of node group 6, can trust communications with other nodes of node group 6. Therefore, when node 2 receives a signature chain that is associated with a particular prefix and a particular origin node group, and when node 1 has previously validated one or more adjacent signatures of another signature chain that originates from the particular origin node group and includes the particular prefix, node 2 may not validate the one or more signatures. Thus, processor resources of node 2 are conserved.

As shown by reference number 134, node 2 may receive a second route update message from node group 5. Assume that the second route update message originates from the same origin node group as the first route update message, and assume that the second route update message is associated with the same prefix as the first route update message. As shown, the second route update message includes a signature chain with signatures of NG 1-NG 2, NG 2-NG 3, NG 3-NG 5, and NG 5-NG 6. As shown by reference number 136, node 2 may determine, based on the signature chain of the first route update message being valid, that the signatures of NG 1-NG 2 and NG 2-NG 3 need not be re-validated. Accordingly, node 2 may not re-validate the signatures of NG 1-NG 2 and NG 2-NG 3, thereby conserving processor resources of node 2.

FIG. 1D shows an example of validating a signature chain based on a trusted node group. As shown, a route update message may originate at node group 1, and may be transmitted to node groups 2, 3, 4, and 5. As further shown, each node group may validate the signature chain of the route update message, may sign the route update message, and may provide the route update message to the next node group. As shown by reference number 138, node group 3 may be a trusted node group of node group 5. For example, node group 3 may be associated with the same service provider as node group 5, may be associated with a government entity, may be associated with a particular security certificate, or the like.

As shown by reference number 140, node group 5 may determine that node group 3 is a trusted node group. Therefore, node group 5 may validate only the signatures, of the signature chain received from node group 4, that have not previously been validated by node group 3 (e.g., NG 3-NG 4 and NG 4-NG 5). In some implementations, node group 3 may provide information, to node group 5, that identifies portions of the signature chain that node group 3 has successfully validated. For example, node group 3 may provide flags, particular bits, or the like, corresponding to portions of the signature chain that node group 3 has successfully validated. As another example, node group 3 may drop all unverifiable signature chains (and corresponding route update messages), and node group 5 may trust node group 3 based on node group 3 dropping all unverifiable signature chains.

In this way, node group 5 conserves processor resources that would otherwise have been used to re-validate each signature in the signature chain.

FIG. 1E is an example of selectively signing a route update message based on whether a recipient of the route update message is permitted to receive a valid signature chain. As shown in FIG. 1E, and by reference number 142, node groups 1 and 2 may be associated with provider networks. For example, node groups 1 and 2 may be associated with an Internet service provider, a government entity, or the like. As shown by reference number 144, node group 3 may be associated with a customer network. For example, node group 3 may be associated with a subscriber, a customer, a client, or the like. As shown by reference number 146, node group 4 may be associated with an end user (e.g., a customer or client of the entity associated with node group 3, etc.). Node group 4 may successfully validate a route update message, or fail to validate the route update message, based on whether node groups 1 through 3 have each properly signed the route update message (e.g., based on whether node group 4 receives a valid signature chain).

As shown, node group 2 may receive a route update message en route to node group 3 from node group 1. As shown by reference number 148, node group 2 may determine whether node group 3 is permitted to receive valid signature chains based on a subscription status of a customer (e.g., an entity associated with node group 3). When node group 2 determines that node group 3 is permitted to receive valid signature chains, node group 2 may sign the route update message, and may provide the route update message to node group 3. As shown, node group 2 may determine that node group 3 is not permitted to receive valid signature chains. For example, the customer associated with node group 3 may not be subscribed to a service to receive valid signature chains, may be associated with a malicious entity that is not to receive valid signature chains, or the like.

As shown by reference number 150, based on node group 3 not being permitted to receive valid signature chains, node group 2 provides the route update message without signing the route update message. As shown by reference number 152, when node group 3 signs and provides the route update message to node group 4, node group 4 may fail to validate the route update message. In some implementations, node group 3 may fail to validate the route update message, and may therefore not provide the route update message. In some implementations, node group 3 may provide an unsigned route update message (e.g., based on receiving the unsigned route update message on a secure session, and therefore not validating the signature associated with node group 2).

In some implementations, node group 3 may not validate the route update message. For example, in some cases, node group 3 may receive the route update message via a secure session with node group 2, thus ensuring that the route update message is not compromised between node group 2 and node group 3. In such a case, node group 3 may not validate the route update message, or may validate a signature other than the signature associated with node group 2. For example, node group 3 may not validate the route update message based on receiving the route update message via a secure session. Thus, node group 3 conserves processor resources and successfully validates the signature chain despite the signature chain not including a signature corresponding to node group 2.

In this way, node group 2 prevents node group 3 from advertising routing information with a valid signature chain and conserves processor resources that would otherwise be used to sign the route update message. Further, by preventing node group 3 from advertising routing information with a valid signature chain, node group 2 may reduce network congestion based on network traffic being routed to node group 2 due to the route update message.

As indicated above, FIGS. 1A-1E are provided merely as examples. Other examples are possible and may differ from what was described with regard to FIGS. 1A 1E.

Figure 2:
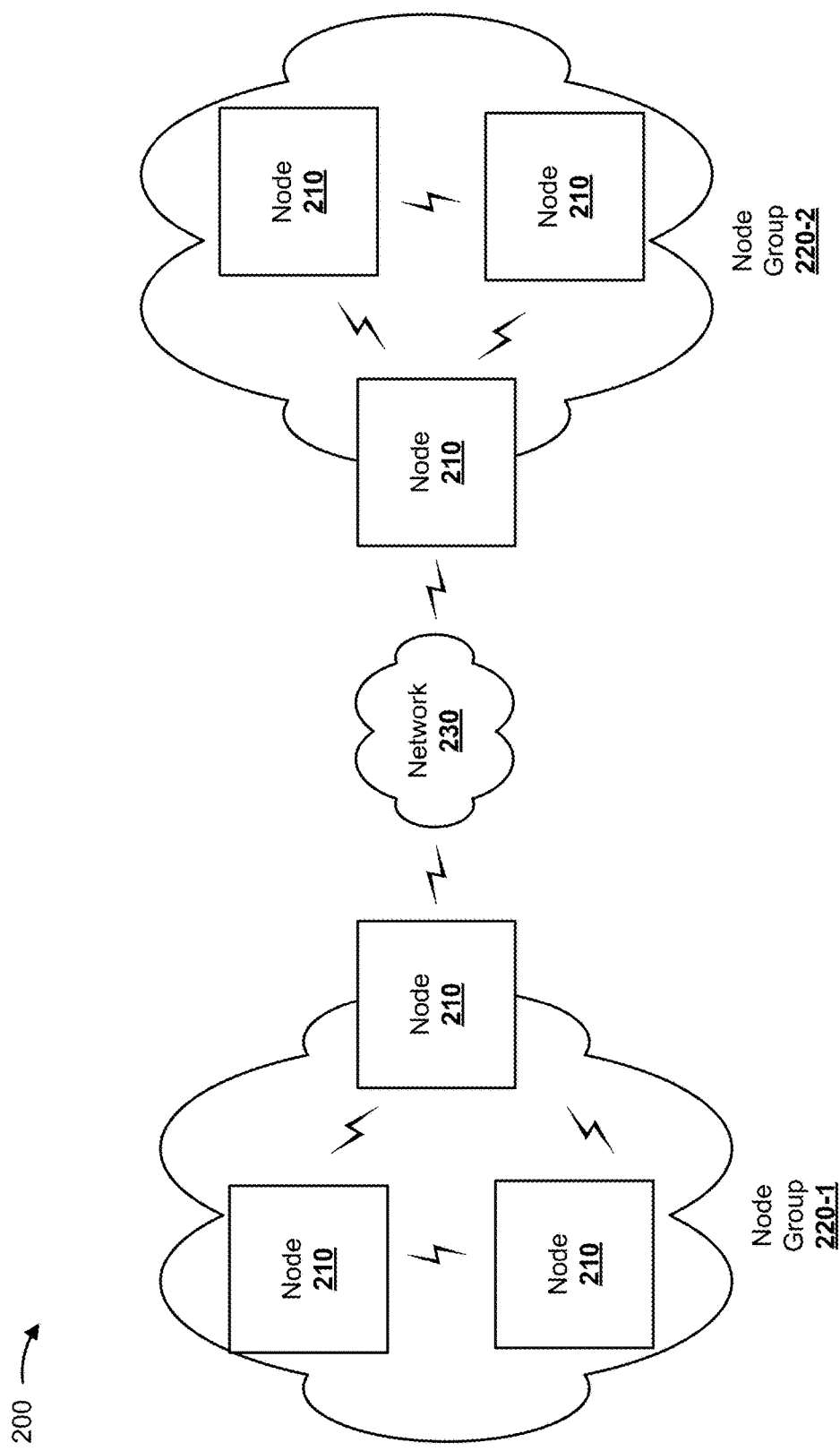
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include nodes 210. Sets of nodes 210 may form node groups 220. Furthermore, environment 200 may include a network 230. Devices of environment 200 may interconnect via wired connections, wireless connections, or a combination of wired and wireless connections.

Node 210 includes one or more network devices (e.g., one or more traffic transfer devices) capable of processing and/or transferring traffic between endpoint devices. For example, node 210 may include a firewall, a router, a gateway, a switch, a hub, a bridge, a reverse proxy, a server (e.g., a proxy server), a security device, an intrusion detection device, a load balancer, or a similar device.

Node group 220 includes one or more nodes 210 (e.g., one or more edge nodes 210 that facilitate communication between different node groups 220 and/or one or more core nodes 210 that facilitate communication between nodes 210 of a particular node group 220). In some implementations, node group 220 may be administered or managed by a particular entity (e.g., a service provider). In some implementations, node group 220 may be associated with one or more internal gateway protocols that specify rules for routing network traffic within node group 220. In some implementations, node group 220 may be associated with one or more external gateway protocols that specify rules for routing network traffic between different node groups 220 (e.g., a border gateway protocol, etc.). In some implementations, node group 220 may include an autonomous system (AS).

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 230 may include one or more node groups 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
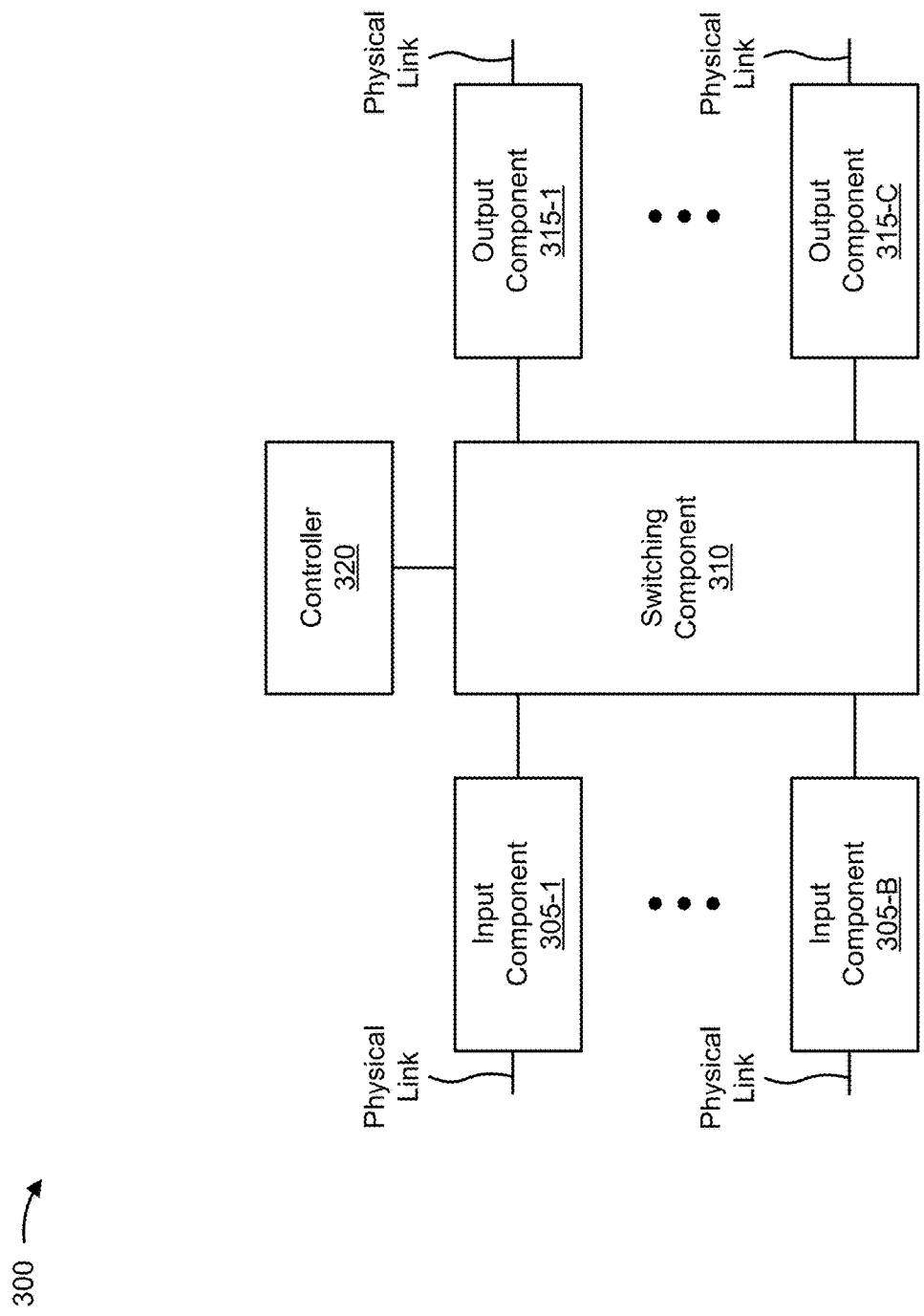
FIG. 3 is a diagram of example components of one or more devices of FIG. 2.

FIG. 3 is a diagram of example components of a device 300. Device 300 may correspond to node 210 and/or node group 220. In some implementations, node 210 and/or node group 220 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
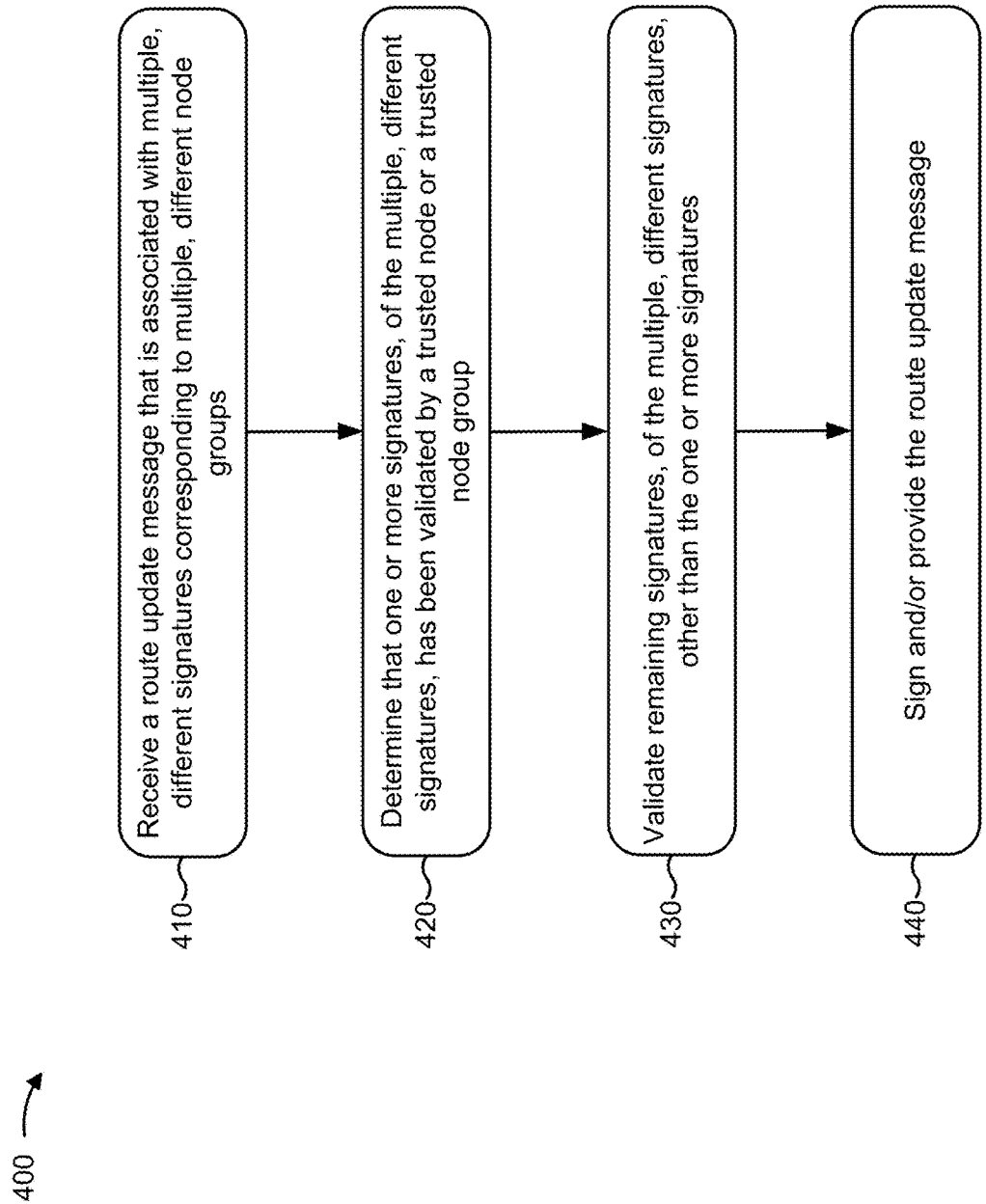
FIG. 4 is a flow chart of an example process for selectively validating signatures based on whether a trusted node or node group has previously validated the signatures.

FIG. 4 is a flow chart of an example process 400 for selectively validating signatures based on whether a trusted node or node group has previously validated signatures associated with the same routing information. In some implementations, one or more process blocks of FIG. 4 may be performed by node group 220. In some implementations, one or more process blocks of FIG. 4 may be performed by another device or a group of devices separate from or including node group 220, such as node 210.

As shown in FIG. 4, process 400 may include receiving a route update message that includes multiple, different signatures corresponding to multiple, different node groups (block 410). For example, node group 220 may receive a route update message. The route update message may identify one or more other node groups 220 that have received and/or transmitted the route update message, and may identify a network prefix. The network prefix may correspond to an origin node group 220 that generated the route update message, and may include, for example, a network address, a bitmask, a mask length, or the like. In some implementations, the network prefix may include network layer reachability information regarding origin node group 220. For example, origin node group 220 (e.g., a node 210 of origin node group 220) may generate the route update message, and may generate a first signature to be associated with the route update message.

Origin node group 220 may provide the route update message to a second node group 220 (e.g., a downstream node group). Second node group 220 may determine whether the first signature is valid and, when the signature is valid, may add the network prefix to a routing table. The first signature may be valid when routing information associated with the first signature has not been altered en route from origin node group 220 to second node group 220. The routing table may indicate that the network prefix can be reached at origin node group 220 via second node group 220. When second node group 220 determines that the first signature is invalid, second node group 220 may drop the route update message, may store information indicating that the first signature is invalid, may provide the route update message without signing the route update message, or the like.

Second node group 220 may generate a second signature, and may add the second signature to a signature chain of the route update message. Thus, the signature chain may include the first signature and the second signature. Second node group 220 may provide the route update message and the signature chain to a third node group 220, which may perform similar operations. For example, third node group 220 may determine whether routing information associated with the first signature and the second signature has been altered based on validating the first signature and the second signature. In this way, the signature chain is generated based on node groups 220 that receive the route update message.

In some implementations, node group 220 may receive multiple route update messages corresponding to an origin node group 220, and including a particular prefix, on multiple, different paths. For example, node group 220 may receive multiple route update messages, originating from origin node group 220 and including a particular prefix, from two or more different node groups 220. As another example, node group 220 may receive multiple route update messages from a particular node group 220, and the multiple route update messages may have traversed different routes to reach the particular node group 220. As yet another example, different nodes 210 of a particular node group 220 may provide corresponding route update messages to one or more nodes 210 of node group 220 (e.g., the same node 210, different nodes 210) via two or more different sessions.

As further shown in FIG. 4, process 400 may include determining that one or more signatures, of the multiple, different signatures, have been validated by a trusted node or a trusted node group (block 420). For example, node group 220 may determine that one or more signatures, of the multiple, different signatures, have been validated by a trusted node 210 or a trusted node group 220. When a signature has been validated by a trusted node 210 or a trusted node group 220, a recipient node group 220 may not re-validate the signature. Thus, processor resources of the recipient node group 220 that would otherwise be used to re-validate the signature are conserved.

In some implementations, two or more different signatures may correspond to the same routing information. For example, a first node 210 may use a first signature algorithm to sign routing information, and a second node 210 may use a second signature algorithm to sign the same routing information. In such a case, after verifying routing information of a first route update message using the first signature algorithm, a downstream node group 220 may determine that the routing information is valid in a second route update message that is associated with the routing information, irrespective of whether the routing information in the second route update message is signed using the first signature algorithm or the second signature algorithm.

For example, assume that the downstream node group 220 receives a first route update message that includes routing information signed using a first signature algorithm, and assume that the downstream node group 220 validates the routing information based on the signatures of the first route update message. Assume further that the downstream node group 220 receives a second route update message that includes the routing information signed using a second signature algorithm. The downstream node group 220 may determine that the routing information is valid without validating the signatures of the second route update message, based on having validated the routing information with regard to the signatures of the first route update message. Thus, node group 220 improves efficiency of the routing verification process when using a different signature algorithm.

In some implementations, a trusted node 210 may be trusted based on being included in a particular node group 220. For example, when two nodes 210 are part of the same node group 220, the two nodes may be trusted nodes of each other. As another example, a node 210 that is part of a trusted node group 220 may be a trusted node 210. In some implementations, a trusted node group 220 may be trusted based on being associated with a particular network administrator or entity. For example, when a first node group 220 is associated with a particular service provider (e.g., an Internet service provider, etc.) and a second node group 220 is associated with a customer of the particular service provider, the first node group 220 may be a trusted node group of the second node group 220. In some implementations, a trusted node group 220 may be trusted based on being associated with a particular certificate, protocol, or the like, that indicates that the trusted node group 220 is to be trusted.

As further shown in FIG. 4, process 400 may include validating remaining signatures, of the multiple, different signatures, other than the one or more signatures (block 430). For example, node group 220 may validate zero or more remaining signatures, of the signature chain associated with the route update message, other than the one or more signatures that were validated by a trusted node 210 or a trusted node group 220. Node group 220 may validate the remaining signatures based on security keys corresponding to the remaining signatures, based on information identifying node groups 220 corresponding to the remaining signatures, or the like. For example, each signature may identify a corresponding node group 220 that generated the signature, and node group 220 may process each signature based on a respective security key associated with the corresponding node group 220 (e.g., a public key corresponding to a private key of each node group 220). Node group 220 may not re-validate signatures that have been validated by a trusted node 210 or a trusted node group 220, which saves processor resources associated with node group 220.

In some implementations, node group 220 may not validate a particular signature of a route update message based on receiving the route update message via a secure session. For example, when a sending node group 220 transmits the route update message, the sending node group 220 may sign the route update message to indicate that the route update message has traveled directly from the sending node group 220 to a recipient node group 220. When the sending node group 220 is associated with a secure session with the recipient node group 220, the route update message may be protected from tampering, re-routing, man-in-the-middle attacks, or the like, based on the secure session. Thus, the recipient node group 220 may conserve processor resources by not validating a signature generated by the sending node group 220.

In some cases, node group 220 may validate signatures to determine whether routing information associated with the signatures is valid. Additionally, or alternatively, node group 220 may determine whether routing information, that is associated with particular signatures, has been validated, irrespective of whether the particular signatures have been validated. For example, the routing information may have been validated and signed by a trusted node group 220 using a first signature algorithm, then later signed by another node group 220 using a second signature algorithm (e.g., in a different route update message). When a downstream node group 220 determines that the routing information has been validated by the trusted node group 220, the downstream node group 220 may skip verification of the signatures associated with the other node group 220 irrespective of the signature algorithm used by the other node group 220.

As used herein, validation of signatures and validation of routing information may be used interchangeably. For example, when a signature is referred to as being validated, this may indicate that the corresponding routing information has been validated. Similarly, when node group 220 determines that a signature has been validated, node group 220 may additionally, or alternatively, determine that the corresponding routing information has been validated. In other words, when implementations, described herein, are described in the context of validating signatures and determining whether signatures have been validated, implementations described herein are equally applicable to determining whether corresponding routing information has been validated. Similarly, where implementations, described herein, are described in the context of validating routing information and determining whether routing information has been validated, implementations described herein are equally applicable to validating corresponding signatures and determining whether the corresponding signatures have been validated.

As further shown in FIG. 4, process 400 may include signing and/or providing the route update message (block 440). For example, node group 220 may generate a signature for the route update message and/or may provide the route update message to one or more other node groups 220. In some implementations, node group 220 may update a routing table based on a result of validating the remaining signatures. For example, assume that the route update message identifies a particular network address, and assume that the route update message was provided to node group 220 via a particular set of node groups 220. In such a case, node group 220 may update a routing table to indicate that network traffic can be routed to the particular network address via the particular set of node groups 220. Additionally, or alternatively, node group 220 may provide a route update message to one or more downstream node groups 220, such as other node groups 220 that are connected with node group 220 by a single hop. In some implementations, node group 220 may drop the route update message (e.g., when validation of the route update message is unsuccessful, etc.). In some implementations, node group 220 may not generate a signature for the route update message before providing the route update message, as described in more detail in connection with FIG. 5, below, which may reduce processor use of node group 220.

In this way, node group 220 conserves processor resources and network resources that may otherwise be used to validate every signature of a signature chain each time a route update message is received.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
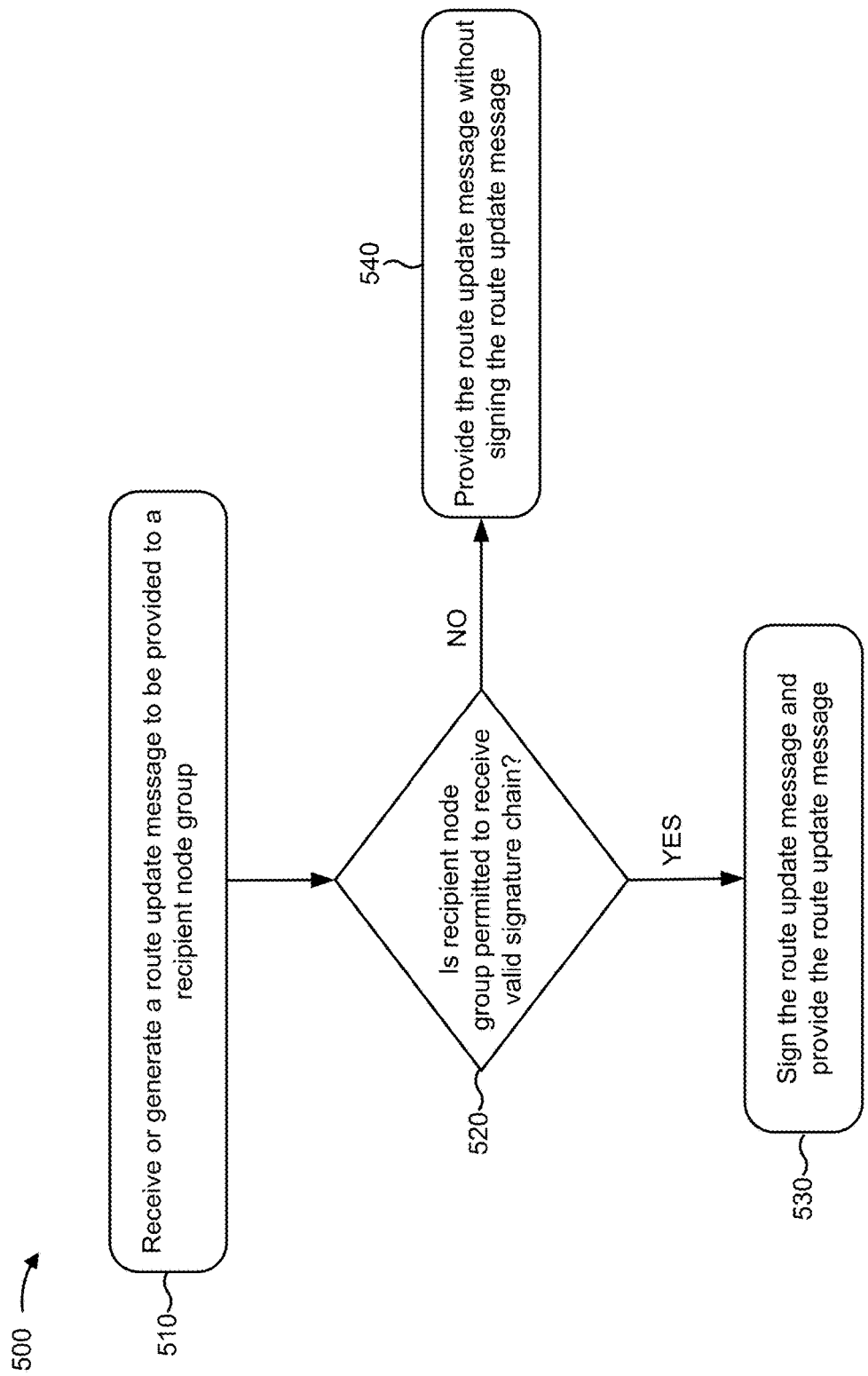
FIG. 5 is a flow chart of an example process for selectively signing a route update message based on whether a future recipient of the route update message is permitted to receive a valid signature chain.

FIG. 5 is a flow chart of an example process 500 for selectively signing a route update message based on whether a future recipient of the route update message is permitted to receive a valid signature chain. In some implementations, one or more process blocks of FIG. 5 may be performed by one or more nodes 210 of node group 220. In some implementations, one or more process blocks of FIG. 5 may be performed by another device or a group of devices separate from or including node group 220, such as node 210. In some implementations, process 500 may be used in conjunction with process 400. In some implementations, process 500 may be used independently of process 400.

As shown in FIG. 5, process 500 may include receiving or generating a route update message to be provided to a recipient node group (block 510). For example, provider node group 220 may receive or generate a route update message. In some implementations (i.e., when provider node group 220 receives the route update message), the route update message may be associated with a signature chain and/or information that identifies node groups 220 that have previously signed the route update message, as described in more detail elsewhere herein. In some implementations, provider node group 220 may generate the route update message.

The route update message may be provided to recipient node group 220, or may be en route to recipient node group 220. In some implementations, recipient node group 220 may be associated with a different network administrator, a different entity, or the like, than provider node group 220. Additionally, or alternatively, recipient node group 220 may be associated with a customer of an entity associated with provider node group 220.

As further shown in FIG. 5, process 500 may include determining whether the recipient node group is permitted to receive a route update message with a valid signature chain (block 520). For example, provider node group 220 may determine whether recipient node group 220 is permitted to receive a route update message that is associated with a valid signature chain. A valid signature chain may include a set of signatures that can be, or have been, successfully validated with regard to each node group 220 corresponding to the set of signatures. In other words, a valid signature chain may include a valid signature corresponding to each node group 220 that has transmitted the route update message.

In some implementations, provider node group 220 may store or obtain information indicating whether recipient node group 220 is permitted to receive a valid signature chain. For example, provider node group 220 may obtain this information from a network administrator device or another device. In some implementations, provider node group 220 may determine whether recipient node group 220 is permitted to receive a valid signature chain based on subscriber information associated with recipient node group 220. For example, when recipient node group 220 is required to subscribe to a particular service to be permitted to receive a valid signature chain, provider node group 220 may determine whether recipient node group 220 is permitted to receive a valid signature chain based on subscription information indicating whether recipient node group 220 subscribes to the particular service.

In some implementations, provider node group 220 may determine whether recipient node group 220 is permitted to receive a valid signature chain based on information identifying recipient node group 220, based on information identifying a network administrator associated with recipient node group 220, based on information indicating that recipient node group 220 is associated with a malicious device or entity, based on whether provider node group 220 is capable of establishing a secure session with recipient node group 220, based on whether provider node group 220 is capable of authenticating recipient node group 220, based on whether recipient node group 220 has previously received a route update message with a valid signature chain, or the like.

As further shown in FIG. 5, if the recipient node group is permitted to receive a route update message with a valid signature chain (block 520—YES), then process 500 may include signing the route update message and providing the route update message (block 530). For example, when provider node group 220 determines that recipient node group 220 is permitted to receive a route update message that is associated with a valid signature chain, provider node group 220 may generate a signature and may add the signature to the signature chain associated with the route update message. Provider node group 220 may provide the route update message and the signature chain to recipient node group 220. In some implementations, provider node group 220 may validate the signature chain, and may add the signature to the signature chain based on validating the signature chain. In this way, provider node group 220 permits recipient node group 220 to successfully validate the route update message and/or to provide the route update message to one or more other node groups 220 with a valid signature chain.

As further shown in FIG. 5, if the recipient node group is not permitted to receive a route update message with a valid signature chain (block 520—NO), then process 500 may include providing the route update message without signing the route update message (block 540). For example, when provider node group 220 determines that recipient node group 220 is not permitted to receive a valid signature chain, provider node group 220 may provide the route update message without providing a valid signature chain. In some implementations, provider node group 220 may provide the route update message without adding a signature to the signature chain, which conserves processor resources of provider node group 220 that would otherwise be used to add the signature to the signature chain. By providing the route update message without signing the route update message, provider node group 220 prevents other node groups 220 that receive the route update message from successfully validating the route update message. Thereby, provider node group 220 may, in effect, block recipient node group 220 from advertising routes to the other node groups 220 with a valid signature chain. Thus, if the other node groups 220 are configured to only accept routes with valid signatures, the other node groups 220 will reject the routes. In this way, node group 220 impairs the ability of recipient node group 220 to provide routes to the other node groups 220 with valid signature chains.

In some implementations, provider node group 220 may add an invalid signature to the signature chain. Additionally, or alternatively, provider node group 220 may add, to the signature chain, a signature that some node groups 220 consider valid and that other node groups 220 do not consider valid. For example, assume that a first set of node groups 220 consider a particular signature type valid and assume that a second set of node groups 220 consider the particular signature type invalid. Assume further that provider node group 220 determines that recipient node group 220 is not permitted to provide a valid signature chain to the second set of node groups 220. In such a case, provider node group 220 may sign a route update message with a signature of the particular signature type. Thus, provider node group 220 prevents recipient node group 220 from advertising a valid route with regard to the second set of node groups 220.

In this way, provider node group 220 conserves processor resources that would otherwise be used to sign route update messages. Further, provider node group 220 may reduce network congestion by preventing unauthorized parties from advertising route information with a valid signature chain. Still further, provider node group 220 may improve security of node groups 220 based on preventing malicious parties from obtaining valid signature chains.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A network node, comprising:
a memory; and
one or more processors to:
receive a message associated with a plurality of valid signatures, the plurality of valid signatures including a respective signature corresponding to each node that transmitted the message across a node group boundary, and the plurality of valid signatures including:
one or more first signatures which were not validated by a sender of the message, and
one or more second signatures which were not validated by a trusted node,
the one or more first signatures being different than the one or more second signatures;

determine that a recipient node is not permitted to receive a valid signature chain, the valid signature chain including the plurality of valid signatures; and provide the message to the recipient node without providing the valid signature chain based on determining that the recipient node is not permitted to receive the valid signature chain.

2. The network node of claim 1, where the one or more processors, when providing the message to the recipient node without providing the valid signature chain, are to:
provide the message to the recipient node without adding a signature to the message.

3. The network node of claim 1, where the one or more processors are further to:
add an invalid signature, and
where the one or more processors, when providing the message to the recipient node without providing the valid signature chain, are to:
provide the message to the recipient node with the invalid signature.

4. The network node of claim 1, where the one or more processors, when providing the message to the recipient node without providing the valid signature chain, are to:
provide a signature that the recipient node will consider invalid in order to prevent the recipient node from advertising routing information.

5. The network node of claim 1, where the one or more processors, when determining that the recipient node is not permitted to receive the valid signature chain, are to:
determine that the recipient node is not permitted to receive the valid signature chain based on one or more of:
information indicating that the recipient node is associated with a malicious device,
information indicating that the recipient node previously received the message,
information indicating that the recipient node is not subscribed to a service to receive valid signatures, or
information indicating that the network node is not able to authenticate the recipient node.

6. The network node of claim 1, where the message includes information that identifies node groups that previously signed the message,
the message including a route update message.

7. The network node of claim 1, where the plurality of valid signatures further includes:
the one or more first signatures having been validated by the trusted node, and
the one or more second signatures having been validated by the sender of the message.

8. A non-transitory computer-readable medium storing instructions, the instructions comprising:
one or more instructions that, when executed by one or more processors of a network node, cause the one or more processors to:

receive a message associated with a plurality of valid signatures,
the plurality of valid signatures including a respective signature corresponding to each node that transmitted the message across a node group boundary, and
the plurality of valid signatures including:
one or more first signatures which were not validated by a sender of the message, and
one or more second signatures which were not validated by a trusted node,
the one or more first signatures being different than the one or more second signatures;

determine that a recipient node is not permitted to receive a valid signature chain, the valid signature chain including the plurality of valid signatures; and provide the message to the recipient node without providing the valid signature chain based on determining that the recipient node is not permitted to receive the valid signature chain.

9. The non-transitory computer-readable medium of claim 8, where the one or more instructions, that cause the one or more processors to provide the message to the recipient node without providing the valid signature chain, cause the one or more processors to:
provide the message to the recipient node without adding a signature to the message.

10. The non-transitory computer-readable medium of claim 8, where the one or more instructions, when executed by the one or more processors, further cause the one or more processors to:
add an invalid signature, and
where the one or more instructions, that cause the one or more processors to provide the message to the recipient node without providing the valid signature chain, cause the one or more processors to:
provide the message to the recipient node with the invalid signature.

11. The non-transitory computer-readable medium of claim 8, where the one or more instructions, that cause the one or more processors to provide the message to the recipient node without providing the valid signature chain, cause the one or more processors to:
provide a signature that the recipient node will consider invalid in order to prevent the recipient node from advertising routing information.

12. The non-transitory computer-readable medium of claim 8, where the one or more instructions, that cause the one or more processors to determine that the recipient node is not permitted to receive the valid signature chain, cause the one or more processors to:
determine that the recipient node is not permitted to receive the valid signature chain based on one or more of:
information indicating that the recipient node is associated with a malicious device,
information indicating that the recipient node previously received the message,
information indicating that the recipient node is not subscribed to a service to receive valid signatures, or
information indicating that the network node is not able to authenticate the recipient node.

13. The non-transitory computer-readable medium of claim 8, where the message includes information that identifies node groups that previously signed the message,
the message including a route update message.

14. The non-transitory computer-readable medium of claim 8, where the plurality of valid signatures further includes:
- the one or more first signatures having been validated by the trusted node, and
- one or more second signatures which were validated by the sender of the message.

15. A method, comprising:
- receiving, by a network node, a message associated with a plurality of valid signatures, the plurality of valid signatures including a respective signature corresponding to
- each node that transmitted the message across a node group boundary, and
    - the plurality of valid signatures including:
        - one or more first signatures which were not validated by a sender of the message, and
        - one or more second signatures which were not validated by a trusted node,
            - the one or more first signatures being different than the one or more second signatures;
- determining, by the network node, that a recipient node is not permitted to receive a valid signature chain,
    - the valid signature chain including the plurality of valid signatures; and
- providing, by the network node, the message to the recipient node without providing the valid signature chain based on determining that the recipient node is not permitted to receive the valid signature chain.

16. The method of claim 15, further comprising:
- adding an invalid signature, and
- where providing the message to the recipient node without providing the valid signature chain comprises:
    - providing the message to the recipient node with the invalid signature.

17. The method of claim 15, where providing the message to the recipient node without providing the valid signature chain comprises:
- providing the message without adding a new valid signature in order to prevent the recipient node from advertising routing information.

18. The method of claim 15, where the message associated with the plurality of valid signatures includes information that identifies node groups that previously signed the message,
- the message including a route update message.

19. The method of claim 15, where determining that the recipient node is not permitted to receive the valid signature chain comprises:
- determining that the recipient node is not permitted to receive the valid signature chain based on one or more of:
    - information indicating that the recipient node is associated with a malicious device,
    - information indicating that the recipient node previously received the message,
    - information indicating that the recipient node is not subscribed to a service to receive valid signatures, or
    - information indicating that the recipient node is not authenticated.

20. The method of claim 15, where the plurality of valid signatures further includes:
- the one or more first signatures having been validated by the trusted node, and
- one or more second signatures having been validated by the sender of the message.

\* \* \* \* \*